ically known. Examples are pigments of the azo, azomethine, methine, anthraquinone, phthalocyanine, perinone, perylene, thioindigo, quinacridone, dioxazine, isoindolinone, isoindoline, diketopyrrolopyrrole, azulene, triaryl-carbonium or of the quinophthalone series.

United States Patent [19]
Bugnon et al.

[11] Patent Number: 4,808,230
[45] Date of Patent: Feb. 28, 1989

[54] ORGANIC PIGMENTS COATED WITH METAL OXIDES FIXED WITH ETHYL CELLULOSE

[75] Inventors: Philippe Bugnon, Essert; Bernhard Medinger, Giffers, both of Switzerland

[73] Assignee: Ciba-Geigy Corporation, Ardsley, N.Y.

[21] Appl. No.: 202,856

[22] Filed: Jun. 6, 1988

[30] Foreign Application Priority Data

Jun. 16, 1987 [CH] Switzerland .......................... 2257/87

[51] Int. Cl.$^4$ ............................. C08L 1/08; B32B 5/16
[52] U.S. Cl. .................................... 106/483; 106/493; 106/498; 106/491; 427/213.31; 428/248; 428/402.24; 523/204; 523/207; 524/46
[58] Field of Search ............................ 428/248, 402.24; 106/493, 491, 193; 524/46; 523/204, 207; 427/213.31

[56] References Cited

U.S. PATENT DOCUMENTS

| | | |
|---|---|---|
| 3,242,051 | 3/1966 | Hiestand et al. ............... 427/213.3 |
| 3,370,971 | 2/1968 | Linton . |
| 3,470,007 | 9/1969 | Linton ............................. 523/200 |
| 3,639,133 | 2/1972 | Linton . |

*Primary Examiner*—Theodore Morris
*Attorney, Agent, or Firm*—Harry Falber

[57] ABSTRACT

Compositions containing an organic pigment coated with metal oxides, wherein the pigment particles are provided with a tenacious, dense, highly crosslinked coating of silica and/or alumina which is fixed by polycondensation of a silicate and/or aluminate with the free hydroxyl groups of a layer of ethyl cellulose that densely coats the surface of the pigment particles.

Pigment compositions of this kind are distinguished in particular by excellent rheological properties in varnish and printing ink systems, by high gloss of the finishes obtained therewith, and by substantial non-deformation of the plastic mouldings pigmented therewith.

10 Claims, No Drawings

ORGANIC PIGMENTS COATED WITH METAL OXIDES FIXED WITH ETHYL CELLULOSE

The present invention relates to organic pigments, the particles of which are provided with a tenacious coating of metal oxides fixed by means of an interlayer of ethyl cellulose. They are distinguished by excellent properties, especially by very good rheological properties.

It is commonly known to coat solid materials with a protective layer of metal oxides, especially of silica and/or alumina, and such products are described, for example, in U.S. Pat. Nos. 2,885,366 and 3,485,658. The former patent specification specifically mentions, for example, coating rutile with silica. It is known, for example, from U.S. Pat. Nos. 3,370,971, 3,470,007 and 3,639,133, that coating inorganic pigment particles, especially lead chromates, with silica, if desired in conjunction with alumina, makes it possible to enhance the properties of said pigments. That organic pigments have also been coated with silica is known from Japanese published patent application Nos. 75/51527, 76/74039 and 79/160433. The results obtained with these methods are, however, not entirely satisfactory, for these coatings are easily removed, especially in solvent systems such as varnishes.

Organic pigments which are coated with hydrogenated metal oxides that are fixed by means of metal salts of homopolymers or copolymers of $\alpha,\beta$-ethylenically unsaturated carboxylic acids are disclosed in U.S. Pat. No. 3,826,670. These preparations too are not satisfactory in all respects, as the colour strength of the pigment is substantially reduced by this method of coating.

Surprisingly, it has now been found that the shortcomings of the prior art pigment compositions of the above mentioned kind can be eliminated, and that it is possible to obtain organic pigments which are provided with a tenacious coating of silica or alumina and which have excellent properties, by fixing said coating to the surface of the pigment particles by means of an interlayer of ethyl cellulose.

Accordingly, the present invention relates to compositions containing an organic pigment coated with metal oxides, wherein the pigment particles are provided with a tenacious, dense, highly crosslinked coating of silica and/or alumina which is fixed by polycondensation of a silicate and/or aluminate with the free hydroxyl groups of a layer of ethyl cellulose that densely coats the surface of the pigment particles.

If the pigment particles are coated with silica, then the polycondensation with silicates is effected via "active" silica, the nature and preparation of which is described, for example, in U.S. Pat. Nos. 3,370,971 and 3,639,133. It is preferred to start from commercial sodium silicate.

If the pigments are coated with alumina, the polycondensation is carried out in situ from alumina formed from an aluminate. The alumina can be obtained, for example, direct from a water-soluble sodium, potassium or magnesium aluminate, in the presence of dilute mineral acid and at a pH in the range from 5 to 10, or from an aqueous aluminate by adjusting the pH to a value from 5 to 7.

If an aluminate is used, dense, substantially amorphous alumina ("dense alumina") is obtained at pH 5–7, and substantially crystalline alumina ("boehmite") at pH 7–10.

It is also possible to use an $SiO_2$ as well as an $Al_2O_3$ donor (selected from the compounds described above) or a mixture of the two, so that a mixed coating of silica and alumina is formed.

All customary organic pigments, for example azo pigments, quinacridones, phthalocyanines, indanthrones, flavanthrones, pyranthrones, perylenes, dioxazines, perinones, thioindigo, quinophthalones and, in particular, diketopyrrolophyrroles, isoindolines, isoindolinones and metal complexes, are suitable for the preparation of the compositions of this invention, which is carried out as described below.

The organic pigment is dispersed by conventional methods in water or a lower alkyl alcohol (e.g. methyl, ethyl, n-propyl, isopropyl, n-butyl, sec-butyl, tert-butyl or amyl alcohol). To this suspension is conveniently added 1 to 20 % by weight, preferably 4 to 12 % by weight, based on the pigment, of ethyl cellulose in powder form or as solution (in the latter case, conveniently dissolved in the same solvent in which the pigment is dispersed). The mixture is normally stirred for at least 1 hour at room temperature in the range from 20° to 50° C. The product is subsequently isolated by filtration and washed with alcohol (preferably that of the dispersion) and water.

The product so obtained moist with water is suspended in water. It is also possible, however, simply to dilute the suspension with at least the same amount of water without isolating the product.

The suspension is then heated, with stirring, to 60°–100° C. and then 0.5 to 50, preferably 1 to 25 and, most preferably, 2 to 12 % by weight of active silica or alumina formed in situ is added. Stirring is continued for 2 to 4 hours and the batch is then neutralised and filtered. The filter residue is washed with water and dried at 80°–120° C. in a vacuum drying oven.

Active silica is obtained, for example, by adjusting the suspension, heated to 60°–100° C., to pH 7–10 with one of the organic or inorganic bases referred to above, then slowly adding sodium silicate and sulfuric acid together in the desired amount, while ensuring that the pH always remains in the alkaline range.

$Al_2O_3$ formed in situ is obtained, for example, by slowly adding either a solution of sodium aluminate to the suspension, heated to 60°–100° C., up to pH 5–9 and keeping the pH constant by addition of sulfuric acid, or by adding a solution of aluminum sulfate up to pH 5–7 and keeping the pH in this range by addition of a base.

Examples of suitable bases for adjusting the pH are preferably inorganic and organic compounds, for example aqueous sodium hydroxide, aqueous potassium hydroxide, ammonia, sodium alcoholate, potassium alcoholate or pyridine.

The compositions of this invention are suitable for use as pigments for colouring high molecular organic material.

Examples of high molecular organic materials which may be coloured or pigmented with the compositions of this invention are cellulose ethers and esters such as ethyl cellulose, nitrocellulose, cellulose acetate, cellulose butyrate, natural resins or synthetic resins such as polymerisation resins or condensation resins, for example aminoplasts, in particular urea/formaldehyde and melamine/formaldehyde resins, alkyd resins, phenolic plastics, polycarbonates, polyolefins, polystyrene, polyvinyl chloride, polyamides, polyurethanes, polyesters, rubber, casein, silicone and silicone resins, singly or in mixtures.

Also suitable are high molecular organic materials in dissolved form as film formers, e.g. boiled linseed oil, nitrocellulose, alkyd resins, phenolic resins, melamine reins, acrylic resins and urea/formaldehyde resins.

The above high molecular compounds may be singly or as mixtures in the form of plastics, melts or of spinning solutions, varnishes, paints or printing inks. Depending on the end use, it is advantageous to use the compositions of the invention as toners or in the form of preparations. The compositions of the invention are preferably employed in an amount of 0.01 to 30 % by weight, preferably 0.1 to 10 % by weight, based on the high molecular organic material to be pigmented.

The pigmenting of the high molecular organic compounds with the compositions of the invention is carried out for example by incorporating such a composition, if appropriate in the form of a masterbatch, into the substrates using roll mills, mixing or grinding machines. The pigmented material is then brought into the desired final form by methods which are spinning, casting or by injection moulding. It is often desirable to incorporate plasticisers into the high molecular compounds before processing in order to produce non-brittle mouldings or to diminish their brittleness. Suitable plasticisers are for example esters of phosphoric acid, phthalic acid or sebacic acid. The plasticisers may be incorporated before or after working the composition into the polymers. To obtain different shades, it is also possible to add fillers or other chromophoric components such as white, coloured or black pigments, in any amount, to the high molecular organic compounds, in addition to the composition of this invention.

For pigmenting varnishes and printing inks, the high molecular organic materials and the compositions of the invention, together with optional additives such as fillers, other pigments, siccatives or plasticisers, are finely dispersed or dissolved in a common organic solvent or mixture of solvents. The procedure may be such that the individual components by themselves, or also several jointly, are dispersed or dissolved in the solvent and subsequently all the components are mixed.

The colourations obtained, for example in plastics, filaments, varnishes or prints, have good allround fastness properties such as good dispersibility, high transparency, good fastness to overspraying, migration, heat, light, and weathering.

The compositions of this invention and, in general, especially those containing pigments which are coated with silica and/or alumina, are distinguished most particularly by outstanding rheological properties in varnish and printing ink systems, by high gloss and excellent "DOI" (distinctness of image) of the finishes obtained therewith, and by substantial non-deformation of the plastic mouldings pigmented therewith.

Because of the good rheological properties of the pigment compositions of this invention, it is possible to prepare varnishes with high loadings of pigments.

The compositions of this invention are preferably suitable for colouring aqueous and/or solvent-containing varnishes, especially automotive varnishes. The most preferred utility is for metallic effect finishes.

The invention is illustrated by the following Examples, in which percentages are by weight, unless otherwise indicated.

EXAMPLE 1

20 g of the isoindolinone pigment, C.I. Pigment Yellow 110, are dispersed in 200 ml of isopropanol in conventional manner. To the warm dispersion of 50° C. are added 2 g of ethyl cellulose and the mixture is stirred for 16 hours. Then 300 ml of water are added. Then 4 g of $Na_2SO_4$ are added to the suspension, the temperature is raised to 80° C., and the pH is adjusted from 6.9 to 9.5 by addition of 1N NaOH. The simultaneous addition of 3.8 g of sodium silicate (26.5 % $SiO_2$), diluted with 60 ml of water (=5 % $SiO_2$, based on pigment), and 24 ml of 0.2M $H_2SO_4$, diluted with 60 ml of water, is then made, while the pH remains constant at ~9.5. The suspension is stirred for 2 hours, the pH is lowered to 8.0, and stirring is continued for 1/2 hour. After cooling to room temperature, the product is isolated by filtration, washed with water, and dried at 80° C. in a vacuum drying oven.

EXAMPLE 2

The procedure of Example 1 is repeated, replacing C.I. Pigment Yellow 110 by the same amount of the metal complex pigment, C.I. Pigment Yellow 129, and using 0.8 g instead of 2 g of ethyl cellulose.

EXAMPLE 3

The procedure of Example 1 is repeated, replacing C.I. Pigment Yellow 110 by the same amount of the diketopyrrolopyrrole pigment, C.I. Pigment Red 255.

EXAMPLE 4

The procedure of Example 1 is repeated, replacing C.I. Pigment Yellow 110 by the same amount of the copper phthalocyanine pigment, C.I. Pigment Blue 15:3.

EXAMPLE 5 a) 150 g of C.I. Pigment Yellow 110 are dispersed in 2000 ml of isopropanol in the same manner as described in Example 1. With stirring, 15 g of ethyl cellulose are added to the warm dispersion of 50° C. The mixture is then allowed to cool to room temperature and stirred for 16 hours. The product is isolated by filtration, washed with isopropanol and water, stirred in 1850 ml of water and dispersed in conventional manner.

(b) 133 g of the dispersion obtained in a) are heated to 85°–90° C. The pH is adjusted to 9. To the dispersion are then added, over 1 hour, 1 g of sodium silicate (26.5 % $SiO_2$), diluted in 50 ml of water (=1.5 % $SiO_2$, based on pigment) and the pH rises to 9.8. The suspension is stirred for 1 hour, then the pH is adjusted to 8.5 and the temperature is lowered to 65° C. To the suspension are then added, over 30 minutes, 20 ml of a 1 % aqueous solution of $NaAlO_2$ (=0.25 % $Al_2O_3$, based on pigment), while keeping the pH constant at 8.5 by addition of dilute $H_2SO_4$. The suspension is stirred for a further 1 hour at 60° C. After cooling to room temperature, the coated pigment is worked up as described in Example 1.

EXAMPLE 6

133 g of the dispersion obtained in Example 5 (a) are heated to 60° C. The pH is adjusted to 3.0. To the dispersion are added, over 2 hours, 20 ml of a 1 % solution of $NaAlO_2$ (=0.25 % of $Al_2O_3$, based on pigment) in 50 ml of water. The pH rises to 8.5 and is kept constant at this value by addition of 0.2M $H_2SO_4$. Stirring is continued for 15 minutes, then the pH is adjusted to 5.7 and a further 20 ml of the 1 % solution of $NaAlO_2$ (=0.25 % $Al_2O_3$, based on pigment) in 50 ml of water and 10 ml of 0.2M $H_2SO_4$ in 50 ml of water are added, while keeping the pH constant at ~5.7. The suspension is stirred for 1 hour, cooled to room temperature, and the coated pigment is worked up as described in Example 1.

EXAMPLE 7

133 g of the dispersion obtained in Example 5 (a) are heated to 60° C. The pH is adjusted to 5.7. To this dispersion are added, over 1 hour and at constant pH, 1 g of $NaAlO_2$ (=1.25 % $Al_2O_3$, based on pigment) in 100 ml of water. The suspension is stirred for 3 hours. The pH is raised to 8.5 and the suspension is stirred for 15 minutes. After cooling, the product is isolated by filtration, washing with water and dried at 80° C. in a vacuum drying oven.

EXAMPLE 8

10 g of the isoindolinone pigment, C.I. Pigment Yellow 110, are dispersed in a 1 % solution of ethyl cellulose in isopropanol over 16 hours. Then 200 ml of water are added, the temperature is raised to 80° C., and the pH is adjusted from 6.0 to 8.8 by addition of 1N NaOH. To the dispersion are then added simultaneously, over 30 minutes, a solution of 3.3 g of $Al_2(SO_4)_3 \cdot 18H_2O$ (=5 % $Al_2O_3$, based on pigment) in 50 ml of water and a 0.75N solution of NaOH, whereupon the pH first falls to 6.5 and then should remain constant. The suspension is stirred for 3 hours at 80°–90° C. After cooling to room temperature, the product is isolated by filtration, washed with water and dried at 80° C. in a vacuum drying oven.

Use Examples 9–14

To determine the flow properties, the compositions of this invention listed in the following Table, as well as the corresponding untreated pigments, are incorporated in conventional manner into an alkyd paint system (Setal ® 84, Kunstharzfabriek Synthesis B.V., Holland; solids content: 70 % by weight).

The flow properties of the mill bases so obtained, which contain 9 % by weight of pigment and 40.5 % by weight of total solids, and whose pigment/binder ratio is 0.3, are determined with a HAAKE viscosimeter (®Rotovisco RV 12; measuring temperature: 25° C., measuring system: SV-SP, shear range: D =0-100 [l/s]). For simple characterisation of the flow curve, viscosity values at D =10 [l/s] and 100 [l/s], calculated from an optimum regression curve, can be cited.

Lower values denote enhanced flow properties.

| Example | Composition | Viscosity values in mPa.s at D = 10 [l/s] | at D = 100 [l/s] |
| --- | --- | --- | --- |
| 9 | C.I. Pigment Yellow 110 + ethyl cellulose + SiO$_2$ (Example 1) | 777 | 174 |
| 10 | C.I. Pigment Yellow 129 + ethyl cellulose + SiO$_2$ (Example 2) | 878 | 156 |
| 11 | C.I. Pigment Red 255 + ethyl cellulose + SiO$_2$ (Example 3) | 267 | 94 |
| 12 | C.I. Pigment Blue 15:3 + ethyl cellulose + SiO$_2$ (Example 4) | 813 | 213 |
| 13 | C.I. Pigment Yellow 110 + ethyl cellulose + SiO$_3$ + Al$_2$O$_3$ (Example 5) | 860 | 165 |
| 14 | C.I. Pigment Yellow 110 + ethyl cellulose + Al$_2$O$_3$ (Example 6) | 841 | 161 |

The viscosity values reported in the following Table are obtained for the corresponding untreated pigments.

| Pigment | Viscosity values in mPa.s at D = 10 [l/s] | at D = 100 [l/s] |
| --- | --- | --- |
| C.I. Pigment Yellow 110 | 1320 | 297 |
| C.I. Pigment Yellow 129 | 1628 | 369 |
| C.I. Pigment Red 255 | 448 | 108 |
| C.I. Pigment Blue 15:3 | 1916 | 389 |

USE EXAMPLE 15

To determine the flow properties of the pigment of Example 8 (C.I. Pigment Yellow 110 + ethyl cellulose + Al$_2$O$_3$), the pigment is likewise incorporated in conventional manner into an alkyd paint system ( ®Setal 84, Kunstharzfabriek Synthesis B.V., Holland; solids content: 70% by weight). The same is also done with the corresponding untreated pigment. The mill bases are prepared as described for Examples 9–14, but they contain 12 % instead of 9 % of pigment and 54 % instead of 40.5% of total solids.

The following viscosity values are obtained for the pigment of Example 8:

at D=10 [l/s]: 1885 mPa.s
at D=100 [l/s]: 517 mPa.s

The viscosity values obtained for the untreated pigment are:

at D=10 [l/s]: 3782 mPa.s
at D=100 [l/s]: 833 mPa.s

What is claimed is:

1. A composition containing an organic pigment coated with metal oxides, wherein the pigment particles are provided with a tenacious, dense, highly crosslinked coating of silica and/or alumina which is fixed by polycondensation of a silicate and/or aluminate with the free hydroxyl groups of a layer of ethyl cellulose that densely coats the surface of the pigment particles.

2. A composition according to claim 1, wherein the coating consists of silica.

3. A composition according to claim 1, wherein the coating consists of silica and is obtained by using sodium silicate.

4. A composition according to claim 1, wherein the coating consists of alumina.

5. A composition according to claim 1, wherein the coating consists of alumina and is obtained by using NaAlO$_2$.

6. A composition according to claim 1, wherein the coating consists of silica and alumina.

7. A composition according to claim 1, which contains ethyl cellulose in an amount of 1 to 20 % by weight, based on the pigment.

8. A composition according to claim 1 which contains silica and/or alumina in an amount of 0.5 to 50 % by weight, based on the pigment.

9. A composition according to claim 1, wherein the pigment is selected from the group consisting of diketopyrrolopyrrole, isoindoline, isoindolinone or metal complex pigments.

10. High molecular organic material containing a composition as claimed in claim 1.

* * * * *